United States Patent
Sparrow et al.

(10) Patent No.: US 10,665,353 B2
(45) Date of Patent: May 26, 2020

(54) VVER-1000 FUEL ASSEMBLY BOTTOM NOZZLE

(71) Applicant: Westinghouse Electric Company LLC, Cranberry Township, PA (US)

(72) Inventors: James A. Sparrow, Irmo, SC (US); Jeffrey T. Alexander, Columbia, SC (US)

(73) Assignee: Westinghouse Electric Company LLC, Cranberry Township, PA (US)

( * ) Notice: Subject to any disclaimer, the term of this patent is extended or adjusted under 35 U.S.C. 154(b) by 1585 days.

(21) Appl. No.: 13/899,699

(22) Filed: May 22, 2013

(65) Prior Publication Data

US 2020/0135346 A1    Apr. 30, 2020

(51) Int. Cl.
*G21C 3/32* (2006.01)
*G21C 3/33* (2006.01)

(52) U.S. Cl.
CPC .................................. *G21C 3/3305* (2013.01)

(58) Field of Classification Search
CPC . G21C 3/32; G21C 3/326; G21C 3/30; G21C 3/36; G21C 3/38; G21C 3/322; G21C 3/324; G21C 3/334; G21C 3/335; G21C 3/00; G21C 3/04; G21C 3/06; G21C 3/344; G21C 3/348; G21C 3/352
USPC ................ 376/172, 362, 443, 444, 363, 364
See application file for complete search history.

(56) References Cited

U.S. PATENT DOCUMENTS

| | | | | |
|---|---|---|---|---|
| 3,764,471 A | * | 10/1973 | Ripley | ................... G21C 3/332 376/442 |
| 4,560,532 A | * | 12/1985 | Barry | ..................... G21C 3/322 376/434 |
| 6,738,447 B1 | | 5/2004 | Sparrow et al. | |
| 7,515,674 B2 | | 4/2009 | Sparrow et al. | |
| 8,116,423 B2 | | 2/2012 | Bashkirtsev et al. | |
| 2011/0002435 A1 | | 1/2011 | Lu et al. | |
| 2011/0280361 A1 | * | 11/2011 | Rudolph | .............. G21C 3/3305 376/438 |

FOREIGN PATENT DOCUMENTS

EP      2077560 B1 *  7/2009  ............... G21C 3/08

OTHER PUBLICATIONS

Patent Office of Ukraine, "Preliminary report on substantive examination", from corresponding UA Application No. a 2014 05432, Jul. 4, 2019, 8 pp.
D1: Leskin S.T., Shelegov A.S., Slobodchuk V.I. Physicheskie osobennosti I konstrukciya reaktora VVER-1000. Uchebnoe posobie. M: NIYaU MIFI, 2011.—Study Guide "Physical features and design of the VVER-1000 reactor", 18 pp.

* cited by examiner

*Primary Examiner* — Marshall P O'Connor
(74) *Attorney, Agent, or Firm* — K&L Gates LLP

(57) ABSTRACT

A VVER-1000 nuclear fuel assembly having a modified bottom nozzle with chamfers at the upper edge of the frustoconical transition from a hexagonal upper section of the nozzle to the lower circular end that mounts on a lower core support.

6 Claims, 3 Drawing Sheets

VVER-1000 FUEL ASSEMBLY BOTTOM NOZZLE

BACKGROUND

1. Field

This invention relates generally to fuel assemblies for pressurized water nuclear reactors and more particularly to a bottom nozzle design for such fuel assemblies.

2. Related Art

In nuclear reactors of the type designed in the former Soviet Union, the reactor core is comprised of a large number of elongated fuel assemblies, each having a plurality of fuel rods held in an organized hexagonal array by a plurality of grids spaced longitudinally along the fuel rods and secured to stainless steel control rod guide thimbles. The stainless steel control rod guide thimbles extend above and below the ends of the fuel rods and are attached to top and bottom nozzles at their respective ends. The fuel assemblies are arranged in the reactor vessel with the bottom nozzles resting on a lower core plate. An upper core plate rests on the top nozzles and holds down the fuel assemblies from the upward flow of coolant traversing the core.

FIG. 1 is an elevational view of a fuel assembly being generally designated by reference character 10. The fuel assembly 10 is the type used in a pressurized water reactor of the VVER-1000 design and has a structural skeleton which, at its lower end includes a bottom nozzle 12. The bottom nozzle 12 supports the fuel assembly 10 on a lower core plate in the core region of the nuclear reactor. In addition to the bottom nozzle 12, the structural skeleton of the fuel assembly 10 also includes a top nozzle 14 at its upper end and a number of guide tubes or thimbles 16 which align with guide tubes in the upper internals above the core to guide the control rods into and out of the core to control the nuclear reaction. The guide tubes or thimbles 16 extend longitudinally between the bottom and top nozzles 12 and 14 and at opposite ends are rigidly attached thereto.

The fuel assembly 10 further includes a plurality of transverse grids 18 that are axially spaced along and mounted to the guide thimbles 16 and an organized array of elongated fuel rods 20 transversely spaced and supported by the grids 18. The grids 18 are conventionally formed from an array of orthogonal straps that are interleaved in an egg-crate pattern with the adjacent interface of four straps defining approximately square support cells through which the fuel rods 20 are supported in transverse, spaced relationship with each other. The orthogonal array of straps is welded at each strap end to a bordering strap 22 to complete the grid structure. The bordering straps 22 include upper and lower tabs which are bent inward and are intended to prevent the grids from hanging up on adjacent grids as the fuel assembly is loaded into a core of a reactor. However, recently some difficulty has been experienced in loading new fuel assemblies into the reactor core wherein the bottom nozzles of the fuel assemblies get hung up on the tabs 24 of the grids 18 on adjacent fuel assemblies resulting in the tabs on the adjacent fuel assemblies being bent out of alignment. As can be seen in FIG. 1, the bottom nozzle has six planar surfaces that extend substantially parallel to the longitudinal axis of the fuel assembly and around the periphery of the bottom nozzle. The planar surfaces 26 transition to a circular lower end 30 that has a smaller diameter than the planar surfaces 26, through a frustoconical axial segment 28. As a fuel assembly is loaded into a core of a nuclear reactor the bottom nozzle gets hung up at the transition to the frustoconical segment 28, on the tabs 24 on adjacent fuel assemblies, as can be appreciated from the side view of a partial bottom nozzle shown in FIG. 2 and the front view shown in FIG. 3.

Accordingly, it is an object of this invention to modify the design of the bottom nozzle so that it does not get hung up on adjacent grid tabs.

Furthermore, it is an object of this invention to provide such a modification that will not adversely impact the pressure drop experienced around the fuel assembly.

SUMMARY

These and other objects are achieved by an elongated nuclear fuel assembly having an axis along an elongated dimension of the fuel assembly extending from an upper end of a top nozzle to a lower end of a bottom nozzle. The bottom nozzle comprises a multi-sided face having the sides extending in the axial direction and around the circumference of the bottom nozzle, wherein each of the sides of the face has a substantially flat portion that transitions axially to a generally circular, tubular mounting at a lower end. The circular mounting has a radial dimension that is smaller than a corresponding radial dimension extending from the axis to the face and the transition extends along a generally curved path along an axial extent with a taper formed in the transition below at least some of the flat portions. Preferably, the taper is generally flat and the multi-sided face has more than four sides, such as a hex face. Desirably, the flat portions are substantially parallel to the axis of the fuel assembly and the curved surface of the axial extent of the transition has a radius of approximately 5.906 in. (15 cm.). In one embodiment, the taper extends approximately 5-15 degrees from the flat portions and more preferably between 8-12 degrees from the flat portions. In another embodiment a taper extends below each of the flat portions.

BRIEF DESCRIPTION OF THE DRAWINGS

A further understanding of the invention can be gained from the following description of the preferred embodiments when read in conjunction with the accompanying drawings in which.

DESCRIPTION OF THE PREFERRED EMBODIMENT

Figure 1:
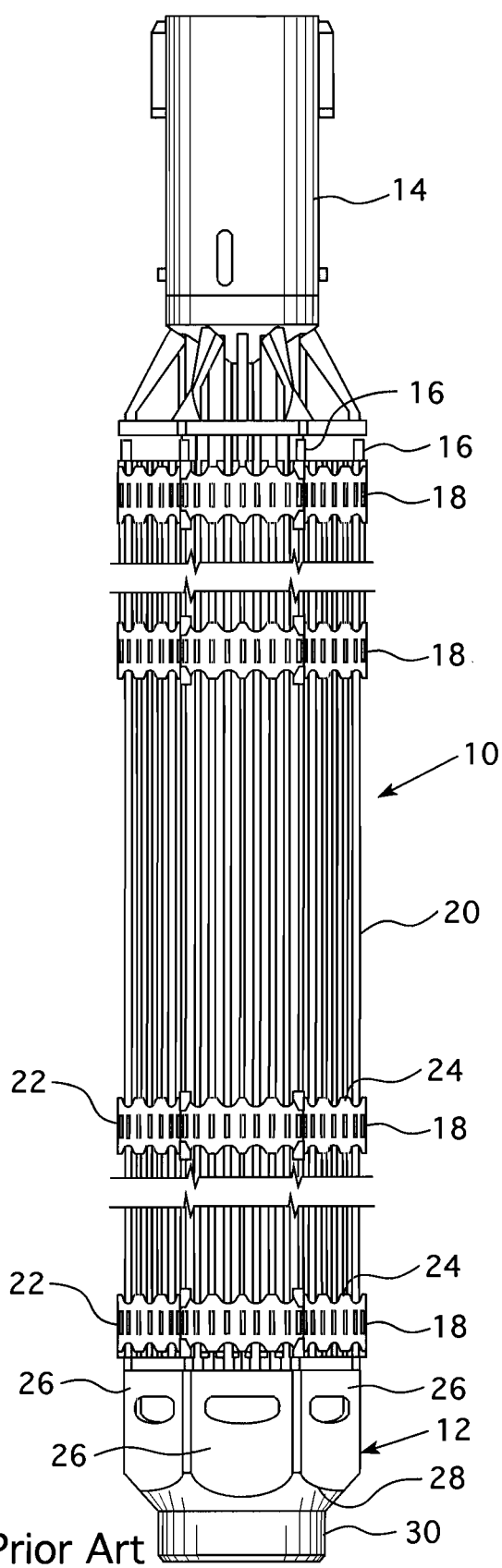
FIG. 1 is an elevational view of a hexagonal fuel assembly with a lower nozzle that can incorporate the design of this invention.
Figure 2:
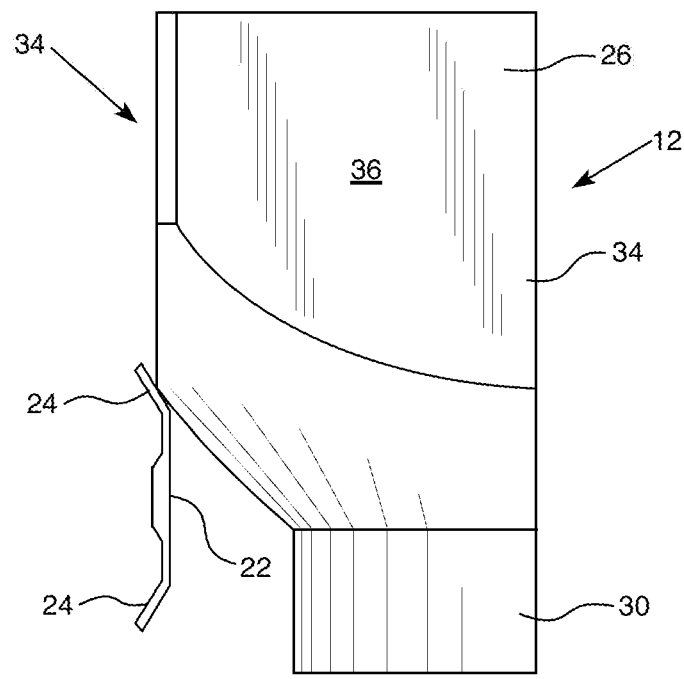
FIG. 2 is a side view of a portion of a prior art bottom nozzle design shown up against a portion of the border strap of an adjacent grid on an adjacent fuel assembly as the bottom nozzle of a fuel assembly is loaded into the core of a nuclear reactor.
Figure 3:
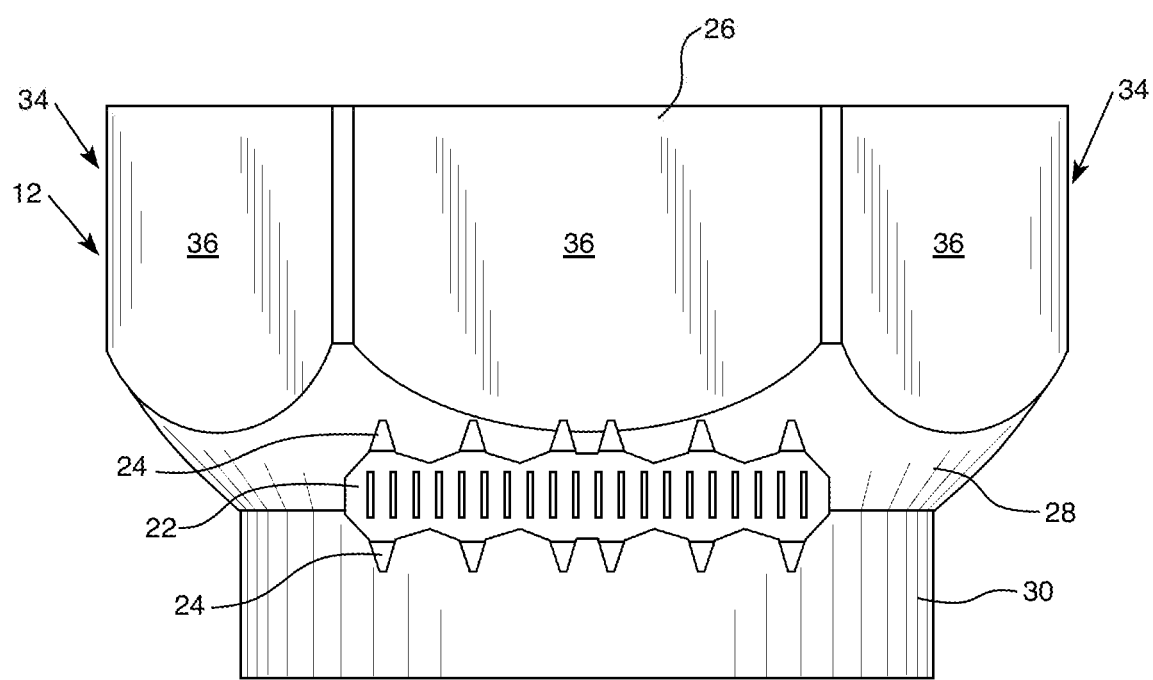
FIG. 3 is a front view of the portion of the bottom nozzle shown in FIG. 2.

As previously described with regard to FIGS. 1-3, the bottom nozzle of conventional hexagonal fuel assembly has an upper multi-sided face 34 having the sides 36 extend in the axial direction and around the circumference of the bottom nozzle 12. Each of the sides of the face has a substantially flat portion 36 that transitions axially to a generally circular, tubular mounting 30 having a radial dimension measured from the central axis 32 of the fuel assembly, that is smaller than a corresponding radial dimension extending from the axis 32 to the face 36 with the transition 28 having a substantially frustoconical shape with a curved axially extending dimension having a radius of approximately 5.906 in. (15 cm.). The transition between the flat surfaces 36 and the frustoconical shape 28 results in inappropriate contact between the assembly be loaded and neighboring assemblies which have been loaded previously, as shown in FIGS. 2 and 3 in which the transition contacts the tabs 24 of the border straps 22 of adjacent grids. The modification offered by this invention adds a lead chamfer 38 (also referred to as a taper or bevel) to the top edge of the transition 28 at the bottom of all six faces of a conventional hexagonal fuel assembly bottom nozzle 12. These chamfers are sized to assure initial contact between the bottom nozzle and each of the grids of neighboring assemblies is spread over a significant portion of the face of the grid while totally eliminating contact between the nozzle and the upper grip tabs 24. The chamfers must be of such a size that no negative impact on fuel assembly engagement with the lower core support tubes occur. The lead in chamfer incorporated in accordance with the embodiment shown in FIGS. 4 and 5 as described hereafter will minimize the interaction between assemblies during fuel assembly loading. The prior art fuel assembly design has no lead-in chamfer which results in inappropriate interaction between the fuel assembly being loaded and neighboring fuel assemblies which have been loaded previously as can be appreciated from the side view in FIG. 2.

As can be seen in FIG. 2, contact between a conventional fuel assembly bottom nozzle 12 and the grid tabs 24 is well inside the outer strap 22 which means that there is a significant bending moment on the tabs 24 themselves which are relatively weak in the axial direction. Also, based on the front view shown in FIG. 3, it can be seen that all of the axial load that is transmitted to the vanes is initially driven through the central two vanes only. As the assembly being loaded continues its downward travel during loading, the reaction load to the grid outer strap starts out in the central portion of the grid and then slowly spreads out over more of the strap during that process. The compressive lateral forces and resultant stresses are much higher when all of the load is being transmitted through the central portion of the grid only.

The embodiment of the invention illustrated in FIGS. 4 and 5 overcomes this condition by providing a lead-in chamfer or bevel 38 in the transition 28 just below the planar surfaces. However, it should be appreciated that the bevel 38 could have been formed in a lower portion of the planar surfaces 26 without detracting from this invention. The lead-in chamfer 38 preferably has an angle relative to the planar surfaces 26 of approximately 5-15 degrees, and terminates preferably short of the generally circular, tubular mounting 30. Preferably the bevel 38 extends axially approximately halfway down the transition 28 from the flat surfaces 26 and is at an angle of approximately between 8-12 degrees relative to the planar surfaces 26.

Figure 4:
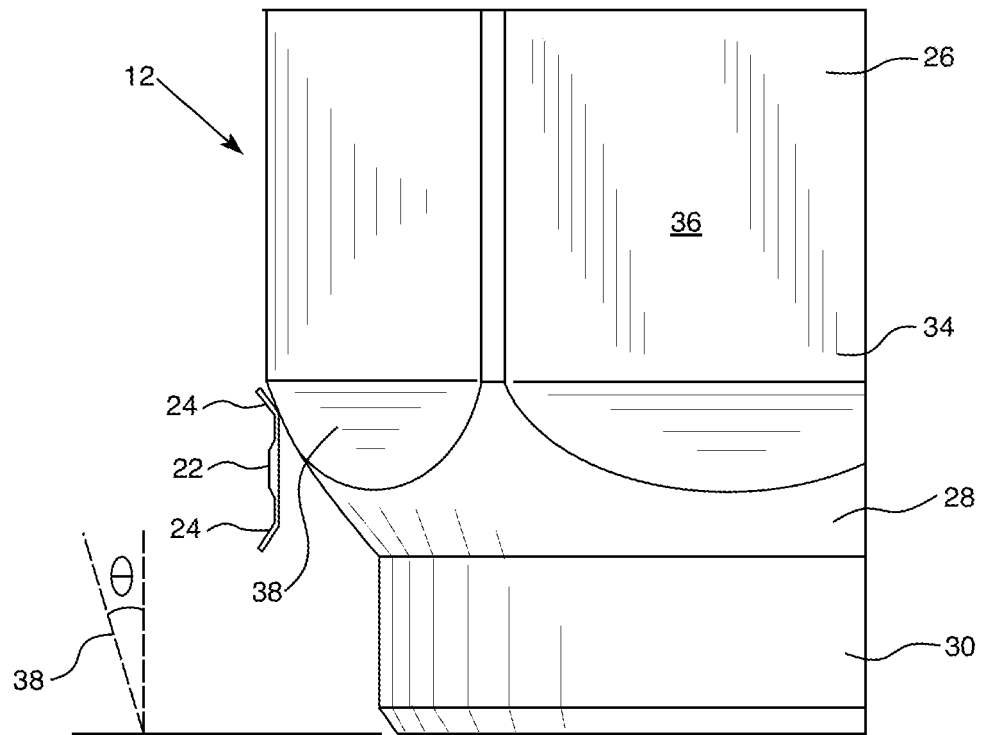
FIG. 4 is a side view of a portion of a modified bottom nozzle in accordance with one embodiment of this invention as it is loaded past the border strap of an adjacent grid on an adjacent fuel assembly.
Figure 5:
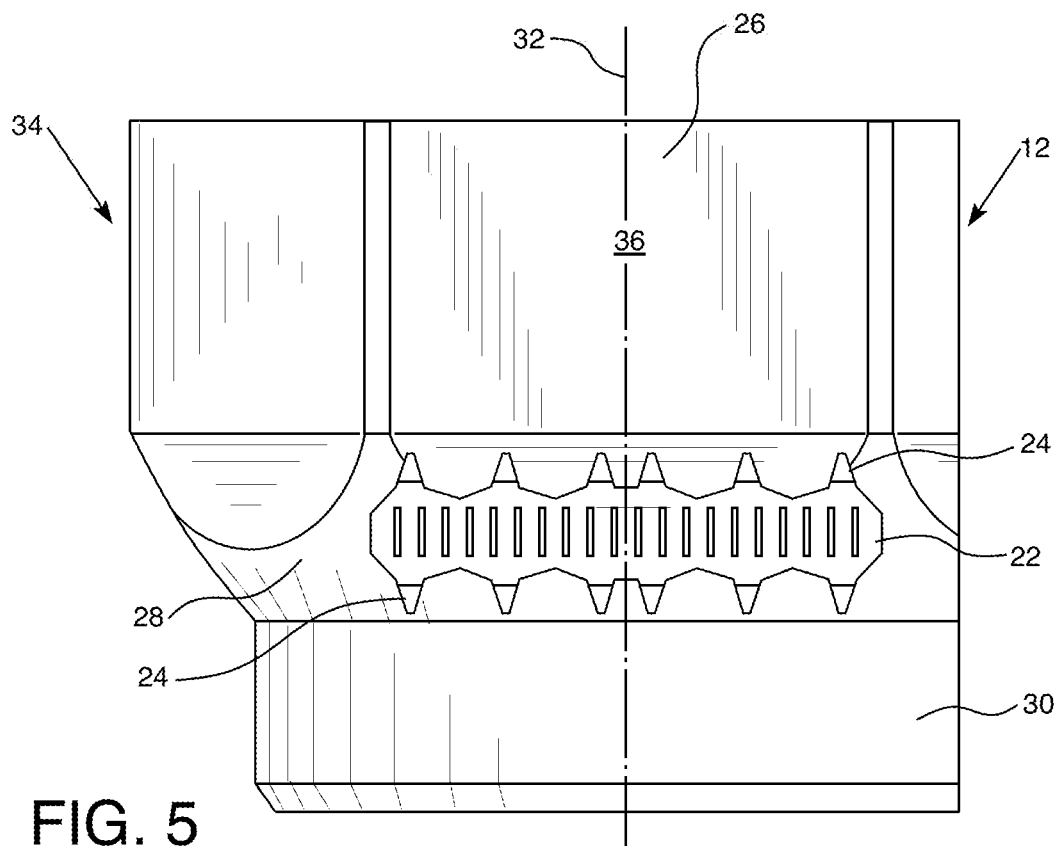
FIG. 5 is a front view of the portion of the bottom nozzle/adjacent border strap shown in FIG. 4.

As can be seen from the side view shown in FIG. 4, contact is made between the bottom nozzle 12 and the grid outer strap 22 and not the tab 24 itself. This means that there will be no load on the outer tabs and therefore they will not be damaged or bent during such interactions. Based on the front view shown in FIG. 5, it can be seen that the entire axial load that is transmitted to the outer strap is initially driven through almost the whole width of the strap. As the assembly continues to travel downward, the resultant lateral load is spread over a much larger portion of the grip strap, essentially the whole strap face. The resultant compressive stresses will be significantly lower with the load being spread over the whole face of the grid and the probability of grid damage will go down dramatically.

While specific embodiments of the invention have been described in detail, it will be appreciated by those skilled in the art that various modifications and alternatives to those details could be developed in light of the overall teachings of the disclosure. Accordingly, the particular embodiments disclosed are meant to be illustrative only and not limiting as to the scope of the invention which is to be given the full breadth of the appended claims and any and all equivalents thereof.

What is claimed is:

1. An elongated nuclear fuel assembly including:
   a top nozzle;
   a bottom nozzle;
   a plurality of fuel rods respectively situated between below the top nozzle and above the bottom nozzle; and
   an axis along an elongated dimension extending from the top nozzle to the bottom nozzle; and
      wherein the bottom nozzle comprises:
      a multi-sided face having sides extending in the axial direction and around the circumference of the bottom nozzle,
      a circular, tubular mounting at a lower end of the bottom nozzle, and
      a transition region between the multi-sided face and the bottom nozzle, wherein the transition region has a frustoconical shape having a plurality of flat taper regions formed therein, each flat taper region corresponding to one side of the multi-sided face such that each flat taper region directly adjoins its corresponding side of the multi-sided face and edges of each flat taper region are aligned with edges of its corresponding side of the multi-sided face where each flat taper region adjoins its corresponding side of the multi-sided face,
      wherein, outside of the flat taper regions, the transition region linearly transitions in radius from a radius of the multi-sided face to a radius of the circular, tubular mounting,
      wherein the flat taper regions extend approximately half of a height of the transition region,
      wherein each of the flat taper regions extends at an angle between 5-15 degrees relative to its corresponding side of the multi-sided face.

2. The nuclear fuel assembly of claim 1 wherein the multi-sided face has more than four sides.

3. The nuclear fuel assembly of claim 2 wherein the bottom nozzle has a hex face.

4. The nuclear fuel assembly of claim 1 wherein the sides of the multi-sided face are substantially parallel to the axis of the fuel assembly.

5. The nuclear fuel assembly of claim 1 wherein each of the flat taper regions extends at an angle between 8-12 degrees relative to its corresponding side of the multi-sided face.

6. The nuclear fuel assembly of claim 1 wherein each of the flat taper regions extends from its corresponding side of the multi-sided face.

\* \* \* \* \*